United States Patent
Kominami et al.

(10) Patent No.: US 9,425,641 B2
(45) Date of Patent: Aug. 23, 2016

(54) BATTERY CHARGING APPARATUS (71) Applicant: Panasonic Corporation, Osaka (JP)

(72) Inventors: Satoshi Kominami, Osaka (JP); Satoshi Ikeda, Osaka (JP); Satoshi Moriguchi, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 300 days.

(21) Appl. No.: 14/351,293

(22) PCT Filed: Nov. 13, 2012

(86) PCT No.: PCT/JP2012/007287
§ 371 (c)(1),
(2) Date: Apr. 11, 2014

(87) PCT Pub. No.: WO2013/073173
PCT Pub. Date: May 23, 2013

(65) Prior Publication Data
US 2014/0253017 A1  Sep. 11, 2014

(30) Foreign Application Priority Data
Nov. 14, 2011  (JP) .................................. 2011-248903

(51) Int. Cl.
H02J 7/00 (2006.01)
H02J 7/02 (2016.01)
B60L 11/18 (2006.01)

(52) U.S. Cl.
CPC .................. H02J 7/025 (2013.01); H02J 7/022 (2013.01); B60L 11/1812 (2013.01); Y02T 10/7005 (2013.01); Y02T 10/7072 (2013.01); Y02T 10/92 (2013.01); Y02T 90/127 (2013.01); Y02T 90/14 (2013.01)

(58) Field of Classification Search
USPC ........................................................ 320/103
See application file for complete search history.

(56) References Cited

U.S. PATENT DOCUMENTS

| 2009/0009144 A1* | 1/2009 | Hoshikawa | ............ G03B 15/05 320/166 |
| 2009/0146607 A1* | 6/2009 | Yang | ....................... H02J 7/345 320/103 |

FOREIGN PATENT DOCUMENTS

| JP | 63-33337 | 3/1988 |
| JP | 8-154311 | 6/1996 |

(Continued)

OTHER PUBLICATIONS

International Search Report issued Feb. 19, 2013 in International (PCT) Application No. PCT/JP2012/007287.

*Primary Examiner* — Bryce Aisaka
(74) *Attorney, Agent, or Firm* — Wenderoth, Lind & Ponack, L.L.P.

(57) ABSTRACT

A battery charger (1000) non-concurrently performing a first operation to charge a main battery (MBA) and a sub-battery (SBA) by using an external power supply (AC), and a second operation to charge the sub-battery by using the main battery, including: a power supply circuit (1); a transformer (3); a secondary-side circuit (4) rectifying a voltage induced in a winding (302) and supplying the voltage to the main battery in a first time period for the first operation, and converting a DC voltage from the main battery into an AC voltage and supplying the AC voltage to the winding in a second time period for the second operation; a conduction angle adjustment circuit (7); and a control circuit (10), the secondary-side circuit being a full-bridge circuit including parallel-connected arms each including parallel-connected bodies connected in series, the parallel-connected bodies each including a switching unit and a rectifying unit connected in parallel.

7 Claims, 6 Drawing Sheets

(56) References Cited

FOREIGN PATENT DOCUMENTS

| JP | 9-65509 | 3/1997 |
| JP | 2004-40901 | 2/2004 |
| JP | 2005-210895 | 8/2005 |

* cited by examiner

BATTERY CHARGING APPARATUS

TECHNICAL FIELD

The present invention relates to battery chargers and, in particular, to a battery charger including a charging circuit for charging a main battery and a sub-battery by using an external power supply and a voltage converting circuit for charging the sub-battery by using the main battery.

BACKGROUND ART

Electric vehicles are equipped with a high-voltage main battery for powering a drive motor and a low-voltage sub-battery for powering auxiliary machineries such as headlamps, windscreen wipers, and various electronic devices. The main battery is typically charged by an external power supply for commercial use via a charging circuit, and the sub-battery is typically charged by the main battery via a voltage converting circuit. Although differing in input/output voltage specifications, the charging circuit and the voltage converting circuit are functionally and structurally similar to each other. From the standpoint of reducing size and cost, battery chargers provided with both of the functions of the charging circuit and the voltage converting circuit have been developed (e.g. Patent Literatures 1 and 2).

Figure 7:
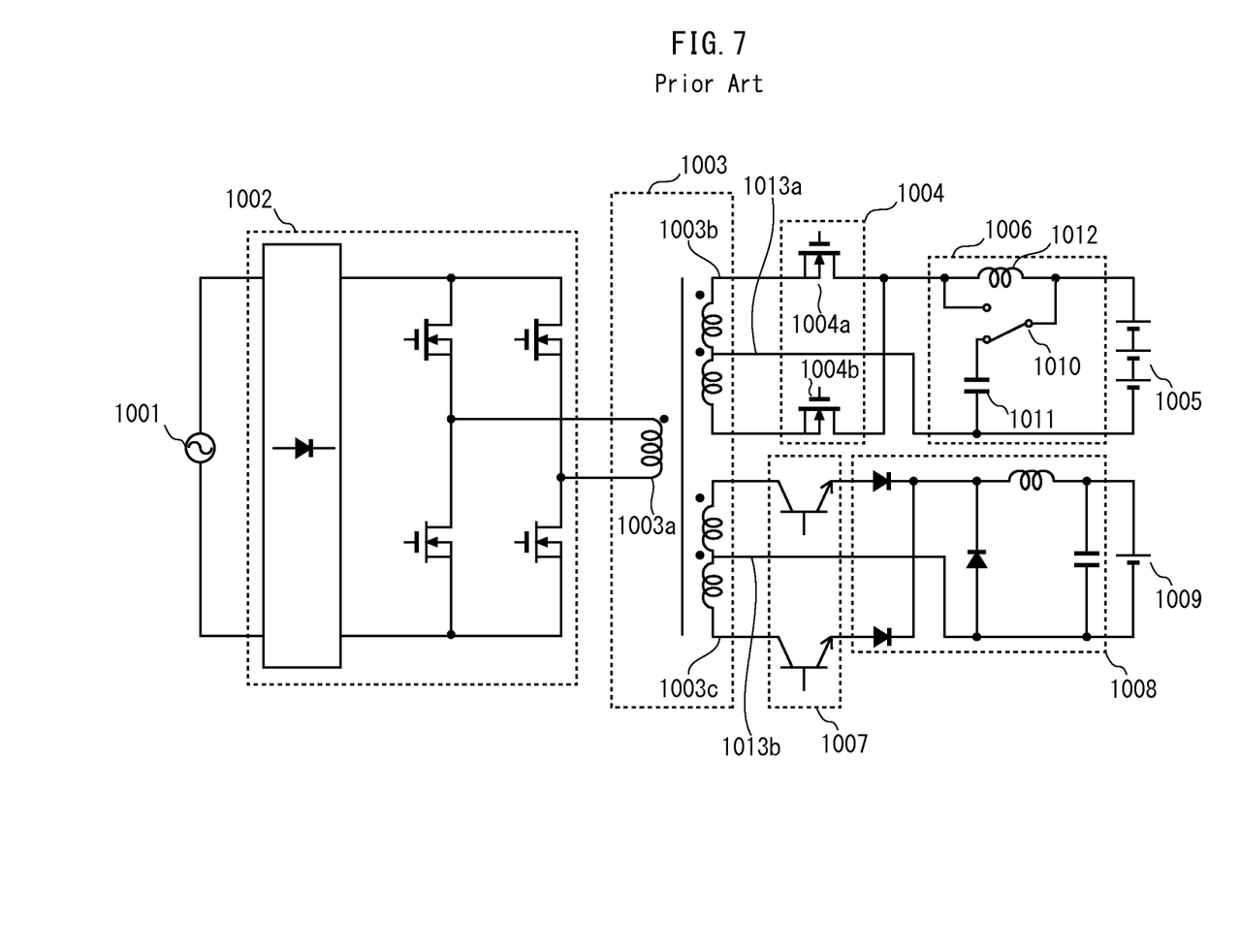
FIG. 7 is a circuit diagram showing an overall structure of a battery charger pertaining to Patent Literature 1.

FIG. 7 is a circuit diagram showing an overall structure of a battery charger pertaining to Patent Literature 1. The battery charger includes: a power supply circuit 1002 connected to an external power supply 1001; a transformer 1003 having a primary winding 1003a connected to the power supply circuit 1002; a secondary-side circuit 1004 connected to a secondary winding 1003b; a smoothing circuit 1006 between the secondary-side circuit 1004 and a main battery 1005; a conduction angle adjustment circuit 1007 connected to a secondary winding 1003c; and a rectifier/smoothing circuit 1008 between the conduction angle adjustment circuit 1007 and a sub-battery 1009.

In a time period for functioning as the charging circuit, a relay 1010 is connected to a capacitor 1011 to charge the main battery 1005 along a route passing through the power supply circuit 1002, the transformer 1003, the secondary-side circuit 1004, and the smoothing circuit 1006. In this time period, the secondary-side circuit 1004 rectifies an AC voltage induced in the secondary winding 1003b by using body diodes of field-effect transistors 1004a and 1004b. The conduction angle adjustment circuit 1007 adjusts a conduction angle of an AC voltage induced in the secondary winding 1003c so that the AC voltage is supplied to the rectifier/smoothing circuit 1008. As a result, the sub-battery 1009 is also charged.

On the other hand, in a time period for functioning as the voltage converting circuit (during driving the vehicle), the relay 1010 is connected to a choke coil 1012 to disable a series circuit of the choke coil 1012 and the capacitor 1011 within the smoothing circuit 1006. The sub-battery 1009 is thus charged along a route passing through the main battery 1005, the smoothing circuit 1006, the secondary-side circuit 1004, the transformer 1003, the conduction angle adjustment circuit 1007, and the rectifier/smoothing circuit 1008. In the time period for functioning as the voltage converting circuit, the secondary-side circuit 1004 converts a DC voltage from the main battery 1005 into an AC voltage.

CITATION LIST

Patent Literature

[Patent Literature 1]
    Japanese Patent Application Publication No. 8-154311
[Patent Literature 2]
    Japanese Utility Model Application Publication No. 63-33337

SUMMARY OF INVENTION

Technical Problem

In the battery charger pertaining to Patent Literature 1, the secondary windings 1003b and 1003c of the transformer 1003 respectively have center taps 1013a and 1013b. This increases the number of terminals of the transformer 1003 to six, leading to a problem of an increase in size of the battery charger. Regarding the secondary winding 1003b that corresponds to a power supply route leading to the main battery 1005 with a small amount of current but with a high voltage, it is necessary to increase a distance between three terminals of the secondary winding 1003b in terms of insulation, leading to a problem of a further increase in size of the secondary winding 1003b.

The present invention has been conceived in view of the above-mentioned problems, and aims to provide a battery charger that can be reduced in size.

Solution to Problems

A battery charger disclosed in the present description is a battery charger non-concurrently performing a first operation to charge a main battery and a sub-battery by using an external power supply, and a second operation to charge the sub-battery by using the main battery, comprising: a power supply circuit connected to the external power supply and configured to generate an AC voltage; a transformer including a primary winding, a first secondary winding, and a second secondary winding, the primary winding being connected to the power supply circuit; a secondary-side circuit along a power supply route connecting the first secondary winding to the main battery, the secondary-side circuit being configured to perform, in a first time period for which the first operation is performed, an operation to rectify an AC voltage induced in the first secondary winding and supply the rectified voltage to the main battery, and, in a second time period for which the second operation is performed, an operation to convert a DC voltage from the main battery into an AC voltage and supply the AC voltage resulting from the conversion to the first secondary winding; a conduction angle adjustment circuit along a power supply route connecting the second secondary winding to the sub-battery, the conduction angle adjustment circuit being configured to adjust an conduction angle of an AC voltage induced in the second secondary winding; and a control circuit configured to control the power supply circuit, the secondary-side circuit, and the conduction angle adjustment circuit, wherein the secondary-side circuit is a full-bridge circuit including a plurality of arms connected in parallel, the arms each including a plurality of parallel-connected bodies connected in series, the parallel-connected bodies each including a switching unit and a rectifying unit connected in parallel.

Advantageous Effects of Invention

According to the battery charger disclosed in the present description, the transformer can be reduced in size, and hence the battery charger as a whole can be reduced in size.

DESCRIPTION OF EMBODIMENTS

According to the battery charger disclosed in the present description, the secondary-side circuit is the full-bridge circuit including the plurality of arms connected in parallel. The arms each include the plurality of parallel-connected bodies connected in series. The parallel-connected bodies each include the switching unit and the rectifying unit connected in parallel. By configuring the secondary-side circuit as the full-bridge circuit, the secondary-side circuit can convert a DC voltage from the main battery into an AC voltage, and supply the AC voltage to the first secondary winding.

Since the number of input terminals of the secondary-side circuit configured as a full-bridge circuit is two, the first secondary winding of the transformer only has to have two terminals. Thus, according to the battery charger disclosed in the present description, the first secondary winding has no center tap while maintaining functions of the battery charger pertaining to Patent Literature 1 to simultaneously charge the main battery and the sub-battery and to charge the sub-battery by using the main battery. As a result of reducing the number of terminals of the first secondary winding, a size of the transformer can be reduced. Furthermore, since the transformer is a large component relative to the other components of the battery charger, an overall size of the battery charger can significantly be reduced by reducing the size of the transformer.

Although the number of parallel-connected bodies included in the secondary-side circuit is increased by configuring the secondary-side circuit as a full-bridge circuit, the increase in number of parallel-connected bodies included in the secondary-side circuit has little effect on the size of the battery charger because the parallel-connected bodies are small components relative to the other components of the battery charger.

The following describes embodiments of the present invention with reference to the drawings.

Embodiment 1

[Structure of Battery Charger]

Figure 1:
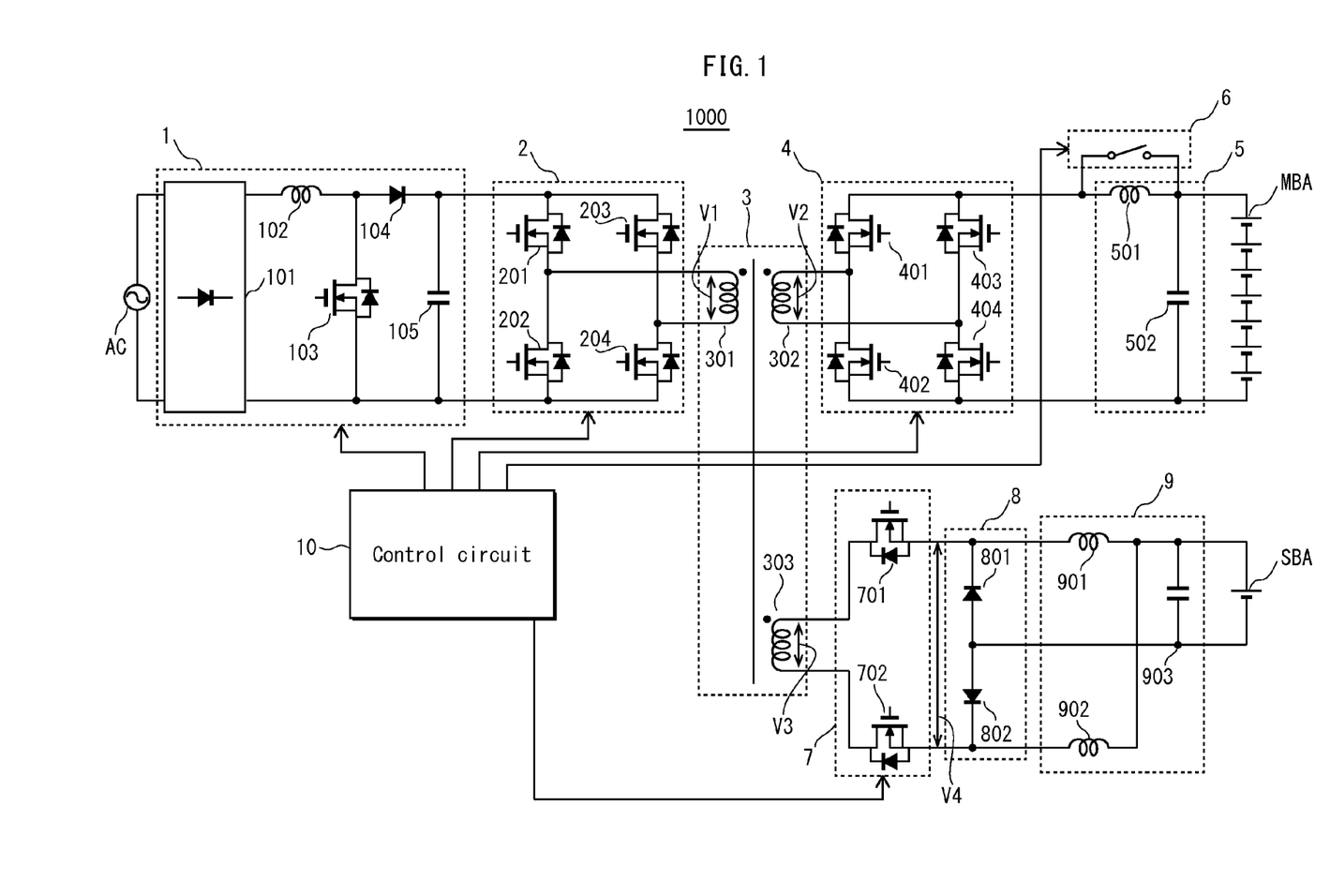
FIG. 1 is a circuit diagram showing an overall structure of a battery charger 1000 pertaining to Embodiment 1.

FIG. 1 is a circuit diagram showing an overall structure of a battery charger 1000 pertaining to Embodiment 1.

The battery charger 1000 charges a main battery MBA and a sub-battery SBA by using an external power supply AC in a first time period, and charges the sub-battery SBA by using the main battery MBA in a second time period. The battery charger 1000 includes a power factor correction circuit 1, a DC/AC inverter 2, a transformer 3, a secondary-side circuit 4, a first smoothing circuit 5, a choke coil short circuit 6, a conduction angle adjustment circuit 7, a rectifier circuit 8, a second smoothing circuit 9, and a control circuit 10.

<External Power Supply AC>

The external power supply AC is for example a commercial power supply of AC 100 V installed in a home and the like.

<Main Battery MBA>

The main battery MBA is made up of a plurality of Li-ion battery cells connected to one another, and generates a voltage of 250 V to 350 V, for example, depending on its state of charge. In the first time period, the main battery MBA is charged up to 350 V, for example.

<Sub-Battery SBA>

The sub-battery SBA is a lead battery with a rated voltage of 12 V, for example. The sub-battery SBA is charged by using the external power supply AC in the first time period, and by using the main battery MBA in the second time period.

<Power Factor Correction Circuit 1>

The power factor correction circuit 1 is connected to the external power supply AC, and includes a diode bridge 101, a choke coil 102, a field-effect transistor (hereinafter, referred to as a FET) 103, a diode 104, and a capacitor 105. The power factor correction circuit 1 is a typical power factor correction circuit.

In the first time period, the power factor correction circuit 1 turns on and off the FET 103 based on a signal from the control circuit 10, thereby converting an AC voltage supplied from the external power supply AC into a DC voltage of 380 V, for example. In the second time period, the power factor correction circuit 1 is in a suspended state in which the operation to convert an AC voltage into a DC voltage is not performed.

<DC/AC Inverter 2>

The DC/AC inverter 2 is a full-bridge circuit including two arms connected in parallel. One of the arms includes FETs 201 and 202 connected in series, and the other one of the arms includes FETs 203 and 204 connected in series. To each of the FETs 201 to 204, a freewheeling diode is connected in parallel. The power factor correction circuit 1 and the DC/AC inverter 2 constitute a power supply circuit connected to the external power supply AC and generating an AC voltage. The power supply circuit boosts an AC voltage supplied from the external power supply AC so that the main battery MBA is charged.

Examples of each of the transistors 201 to 204 are a metal-insulator-semiconductor field-effect transistor (MISFET), a metal-oxide-semiconductor field-effect transistor (MOSFET), a metal-semiconductor field-effect transistor (MESFET), and a junction field-effect transistor (JFET).

In the first time period, the DC/AC inverter 2 operates, based on a signal from the control circuit 10, so that a time period for which the FETs 201 and 204 are on and the FETs 202 and 203 are off and a time period for which the FETs 201 and 204 are off and the FETs 202 and 203 are on are alternately repeated at a frequency of 100 kHz, for example. As a result, a DC voltage supplied from the power factor correction circuit 1 is converted into an AC voltage of 100 kHz, for example.

In the second time period, the DC/AC inverter 2 is in a suspended state in which the operation to convert a DC voltage into an AC voltage is not performed, by turning off all the FETs 201, 202, 203, and 204 based on a signal from the control circuit 10.

<Transformer 3>

The transformer 3 has a primary winding 301, a first secondary winding 302, and a second secondary winding 303, and the primary winding 301 is connected to the DC/AC inverter 2.

The primary winding 301 is connected to a junction of the FETs 201 and 202 at one end, and connected to a junction of the FETs 203 and 204 at the other end.

The first secondary winding 302 is connected to a junction of FETs 401 and 402 at one end, and connected to a junction of FETs 403 and 404 at the other end. Respective ends of the second secondary winding 303 are connected to drain terminals of FETs 701 and 702 included in the conduction angle adjustment circuit 7. In the present embodiment, the primary winding 301, the first secondary winding 302, and the second secondary winding 303 are in a turns ratio of 5:5:1.

In the first time period, the transformer 3 transfers a voltage induced in the primary winding 301 to the first secondary winding 302 and the second secondary winding 303. In the second time period, the transformer 3 transfers the voltage induced in the first secondary winding 302 to the second secondary winding 303.

<Secondary-Side Circuit 4>

The secondary-side circuit 4 is located along a power supply route connecting the first secondary winding 302 to the main battery. The secondary-side circuit 4 is a full-bridge circuit including two arms connected in parallel. One of the arms includes the FETs 401 and 402 connected in series, and the other one of the arms includes the FETs 403 and 404 connected in series. To each of the FETs 401, 402, 403, and 404, a freewheeling diode is connected in parallel. The FET 401 and the freewheeling diode connected in parallel to the FET 401, the FET 402 and the freewheeling diode connected in parallel to the FET 402, the FET 403 and the freewheeling diode connected in parallel to the FET 403, and the FET 404 and the freewheeling diode connected in parallel to the FET 404 respectively constitute a first high-side parallel-connected body, a first low-side parallel-connected body, a second high-side parallel-connected body, and a second low-side parallel-connected body.

The arm including the FETs 401 and 402 is connected to one end of the first secondary winding 302, and the arm including the FETs 403 and 404 is connected to the other end of the first secondary winding 302.

As with the FETs 201 to 204, a freewheeling diode is connected in parallel to each of the FETs 401 to 404. In the present embodiment, as the freewheeling diode connected to each of the FETs 201 to 204 and 401 to 404, a body diode incorporated in each of the FETs is used. This means that, in each of the FETs 201 to 204 and 401 to 404, a switching unit, which corresponds to a channel region of a field-effect transistor, and a rectifying unit, which corresponds to a body diode of the field-effect transistor, are both included in the field-effect transistor as a single element.

In the first time period, the secondary-side circuit 4 turns off all the FETs 401 to 404 based on a signal from the control circuit 10. An AC voltage induced in the first secondary winding 302 is thus rectified by using the body diode of each of the FETs, and supplied to the first smoothing circuit 5.

In the second time period, the secondary-side circuit 4 operates, based on a signal from the control circuit 10, so that a time period for which the FETs 401 and 404 are on and the FETs 402 and 403 are off and a time period for which the FETs 401 and 404 are off and the FETs 402 and 403 are on are alternately repeated at a frequency of 100 kHz, for example. As a result, a DC voltage from the main battery MBA is converted into an AC voltage of 100 kHz and the AC voltage is supplied to the first secondary winding 302 so that the sub-battery SBA is charged.

<First Smoothing Circuit 5 and Choke Coil Short Circuit 6>

The smoothing circuit 5 is a series circuit of a choke coil 501 and a capacitor 502. The choke coil short circuit 6 is achieved by a relay.

In the first time period, the choke coil short circuit 6 performs an opening operation based on a signal from the control circuit 10. As a result, the smoothing circuit 5 acts as a filter circuit of the choke coil 501 and the capacitor 502, and a predetermined DC voltage is generated in the capacitor 502.

In the second time period, the choke coil short circuit 6 performs a short-circuiting operation based on a signal from the control circuit 10. As a result, the choke coil 501 is short-circuited by the choke coil short circuit 6, and the smoothing circuit 5 functions as a mere capacitor.

<Conduction Angle Adjustment Circuit 7>

The conduction angle adjustment circuit 7 is located along a power supply route connecting the second secondary winding 303 to the sub-battery SBA, and includes the FETs 701 and 702. The drain terminals of the FETs 701 and 702 are connected to the respective ends of the second secondary winding 303.

In the first time period, the conduction angle adjustment circuit 7 turns on and off each of the FETs 701 and 702 based on a signal from the control circuit 10, thereby adjusting a conduction angle of an AC voltage induced in the second secondary winding 303 so that the sub-battery SBA is charged.

In the second time period, the conduction angle adjustment circuit 7 adjusts the conduction angle of the AC voltage induced in the second secondary winding 303 based on a signal from the control circuit 10 so that an AC voltage to be supplied to the sub-battery SBA is obtained. Specifically, the conduction angle adjustment circuit 7 turns on the FETs 701 and 702 so as to supply the AC voltage induced in the second secondary winding 303 to the rectifier circuit 8.

<Rectifier Circuit 8>

The rectifier circuit 8 is a series circuit in which anode terminals of diodes 801 and 802 are connected to each other. A cathode terminal of the diode 801 is connected to a source terminal of the FET 701, and a cathode terminal of the diode 802 is connected to a source terminal of the FET 702.

Independently of the first time period or the second time period, the rectifier circuit 8 rectifies the AC voltage from the conduction angle adjustment circuit 7, and supplies the rectified voltage to the second smoothing circuit 9.

<Second Smoothing Circuit 9>

The second smoothing circuit 9 includes choke coils 901 and 902, and a capacitor 903. The choke coil 901 is connected to the choke coil 902 at one end, and connected to a junction of the FET 701 and the diode 801 at the other end. The choke coil 902 is connected to the choke coil 901 at one end, and connected to a junction of the FET 702 and the diode 802 at the other end. The capacitor 903 is connected to a junction of the choke coils 901 and 902 at one end, and connected to a junction of the diodes 801 and 802 at the other end.

Independently of the first time period or the second time period, the second smoothing circuit 9 acts as a filter circuit of the choke coil 901 and the capacitor 903 and as a filter circuit of the choke coil 902 and the capacitor 903 depending on the polarity of the AC voltage induced in the second secondary winding 303, thereby generating a predetermined DC voltage across the capacitor 903.

<Control Circuit 10>

The control circuit 10 control operations of the power factor correction circuit 1, the DC/AC inverter 2, the secondary-side circuit 4, the choke coil short circuit 6, and the conduction angle adjustment circuit 7.

The control circuit 10 includes, for example, a digital circuit such as a micro controller unit (MCU) and a drive circuit for driving each of the FETs included in the battery charger 1000. The control circuit 10 further includes a unit for reading voltages across the capacitors 105, 502, and 903.

In the first time period, the control circuit 10 performs control to turn on and off the FET 103 included in the power factor correction circuit 1 so that the voltage across the capacitor 105 becomes 380 V. The control circuit 10 also performs control to turn on and off each of the FETs 201 to 204 included in the DC/AC inverter 2 so that the voltage across the capacitor 502 becomes a voltage corresponding to the state of charge of the main battery MBA. The control circuit 10 further controls each of the FETs 701 and 702 included in the conduction angle adjustment circuit 7 so that the voltage across the capacitor 903 becomes 14 V, for example. The choke coil short circuit 6 is opened. The control circuit 10 also performs control to turn off each of the FETs 401 to 404 so that the secondary-side circuit 4 performs rectification using body diodes of the FETs 401 to 404.

In the second time period, the control circuit 10 performs control to turn on and off each of the FETs 401 to 404 included in the secondary-side circuit 4 so that the voltage across the capacitor 903 becomes 14 V, for example. The control circuit 10 also performs control to turn off each of the FETs 103 and 201 to 204 so that the power factor correction circuit 1 and the DC/AC inverter 2 are in the suspended state. The control circuit 10 also performs control to short-circuit the choke coil short circuit 6, and to turn on each of the FETs 701 and 702 included in the conduction angle adjustment circuit 7, so that the AC voltage induced in the second secondary winding 303 is supplied to the sub-battery SBA.

[Operation of Battery Charger]

(First Time Period)

Figure 2:
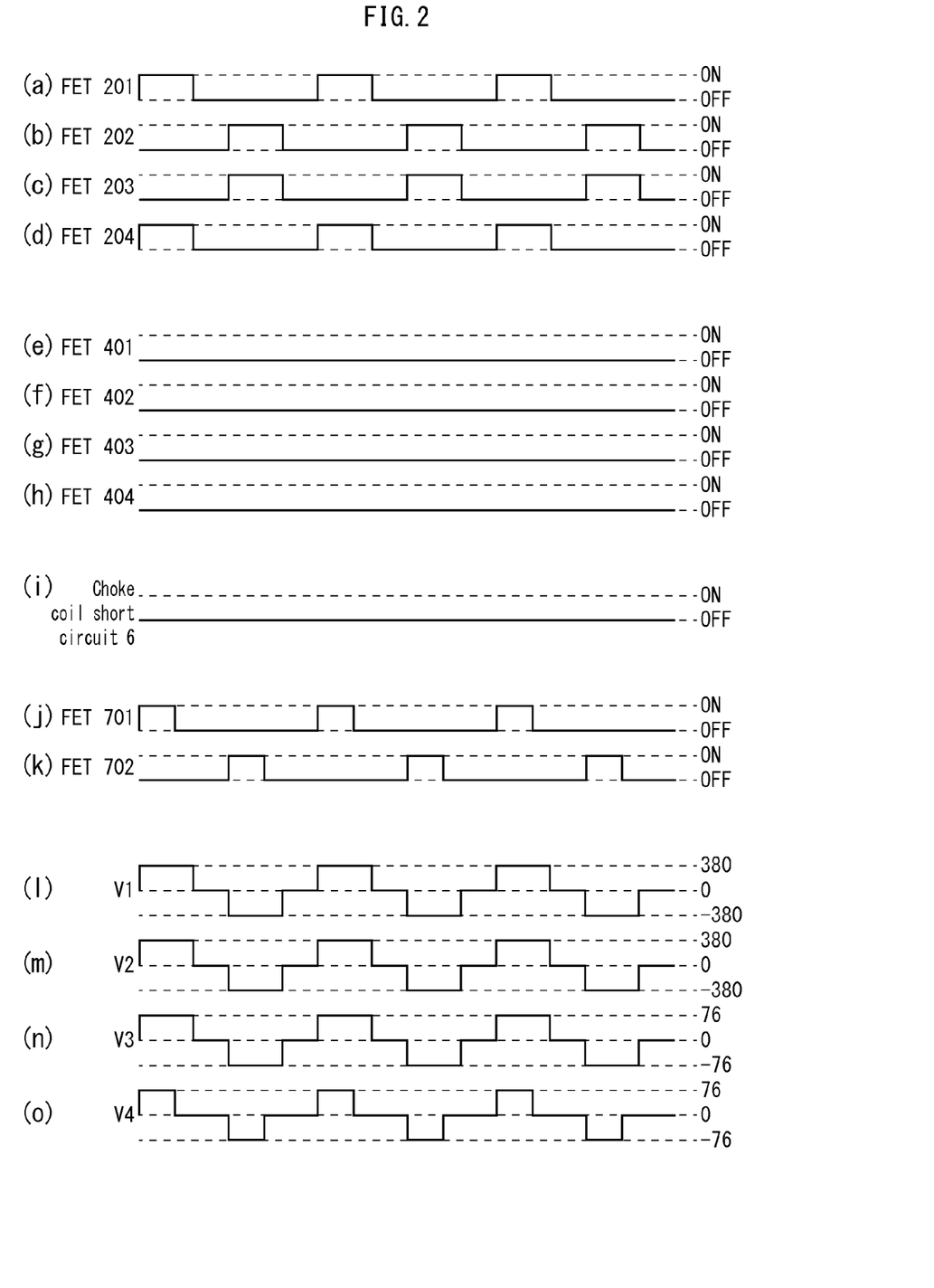
FIG. 2 is a timing diagram in a first time period pertaining to Embodiment 1.

FIG. 2 is a timing diagram in the first time period pertaining to Embodiment 1.

FIG. 2 respectively shows, in (a), (b), (c), and (d), waveforms of control signals for the FETs 201, 202, 203, and 204 output from the control circuit 10. FIG. 2 respectively shows, in (e), (f), (g), and (h), waveforms of control signals for the FETs 401, 402, 403, and 404 output from the control circuit 10. FIG. 2 shows, in (i), a waveform of a control signal for the choke coil short circuit 6. FIG. 2 respectively shows, in (j) and (k), waveforms of control signals for the FETs 701 and 702. FIG. 2 respectively shows, in (l), (m), (n), and (o), a change in a voltage V1 across the primary winding 301 (voltage induced in the primary winding 301), a change in a voltage V2 across the first secondary winding 302 (voltage induced in the first secondary winding 302), a change in a voltage V3 across the second secondary winding 303 (voltage induced in the second secondary winding 303), and a change in a voltage V4 after passing through the conduction angle adjustment circuit 7. The voltages V1 to V4 are also shown in FIG. 1.

As shown in (a), (b), (c), and (d) of FIG. 2, the control circuit 10 controls the on-duty of the FETs 201 to 204 so that the voltage across the capacitor 502 becomes the voltage corresponding to the state of charge of the main battery. As a result, a voltage having a waveform shown in (l) of FIG. 2 is applied to the primary winding 301. The peak value of the voltage V1 across the primary winding 301 depends on an output voltage of the power factor correction circuit 1, and is 380 V here.

In the first time period, the secondary-side circuit 4 performs the rectification using the body diodes. As shown in (e), (f), (g), and (h) of FIG. 2, each of the FETs 401 to 404 is thus turned off. In the first time period, the choke coil short circuit 6 is turned off as shown in (i) of FIG. 2 so that the choke coil short circuit 6 is opened.

Voltages having waveforms shown in (m) and (n) of FIG. 2 are respectively induced in the first secondary winding 302 and the second secondary winding 303. The peak value of the voltage V2 across the first secondary winding 302 depends on the turns ratio of the primary winding 301 to the first secondary winding 302. As described above, in the present embodiment, since the turns ratio of the primary winding 301 to the first secondary winding 302 is 5:5, the peak value of the voltage V2 across the first secondary winding 302 is 380 V, as with the voltage V1 across the primary winding 301.

The peak value of the voltage V3 across the second secondary winding 303 depends on the turns ratio of the primary winding 301 to the second secondary winding 303. As described above, since the turns ratio of the primary winding 301 to the second secondary winding 303 is 5:1, the peak value of the voltage V3 across the second secondary winding 303 is 76 V (=380/5 V).

As shown in (j) and (k) of FIG. 2, the control circuit 10 controls the on-duty of the FETs 701 and 702 so that the voltage across the capacitor 903 becomes 14 V. As shown in (o) of FIG. 2, the voltage V4 after passing through the conduction angle adjustment circuit 7 has the same peak value as the voltage V3 across the second secondary winding 303, but has a waveform with a narrower conduction angle than the voltage V3.

Furthermore, in the first time period, a timing at which the conduction angle adjustment circuit 7 transitions to a conductive state is the same as a timing at which a voltage is applied to the primary winding 301. That is to say, in the first time period, the conduction angle adjustment circuit 7 is in the conductive state at the timing at which the voltage is applied to the primary winding 301. The timing at which the voltage is applied to the primary winding 301 corresponds to, in the waveform of the voltage V1 as shown in (l) of FIG. 2, a timing at which the voltage V1 transitions from 0 V to 380 V and a timing at which the voltage V1 transitions from 0 V to −380 V. Specifically, as shown in (j) and (k) of FIG. 2, the FET 701 included in the conduction angle adjustment circuit 7 is turned on at a timing at which the FETs 201 and 204 are turned on as shown in (a) and (d) of FIG. 2. The FET 702 included in the conduction angle adjustment circuit 7 is turned on at a timing at which the FETs 202 and 203 are turned on.

This allows power stored in a leakage inductance (not illustrated) included in the transformer 3 and consumed as heat to be transferred to the sub-battery SBA through the conduction angle adjustment circuit 7, the rectifier circuit 8, and the second smoothing circuit 9. As a result, power consumption of the transformer 3 is suppressed.

In this case, the timing at which the conduction angle adjustment circuit 7 transitions to the conductive state, i.e. the timing at which the FET 701 or the FET 702 is turned on is set to be the same as the timing at which the voltage is applied to the primary winding 301. Even in a case where the timing at which the conduction angle adjustment circuit 7 transitions to the conductive state is earlier than the timing at which the voltage is applied to the primary winding 301, however, an effect similar to the effect described above can be obtained.

In contrast, it is not desirable to set the timing at which the conduction angle adjustment circuit 7 transitions to the conductive state to be later than the timing at which the voltage is applied to the primary winding 301. This is because, while the conduction angle adjustment circuit 7 blocks a voltage from the second secondary winding 303, power stored in the leakage inductance included in the transformer 3 is internally consumed. For the above-mentioned reason, it is desirable that, in the first time period, the voltage be applied to the primary winding 301 in a state where the conduction angle adjustment circuit 7 is in the conductive state.

(Second Time Period)

Figure 3:
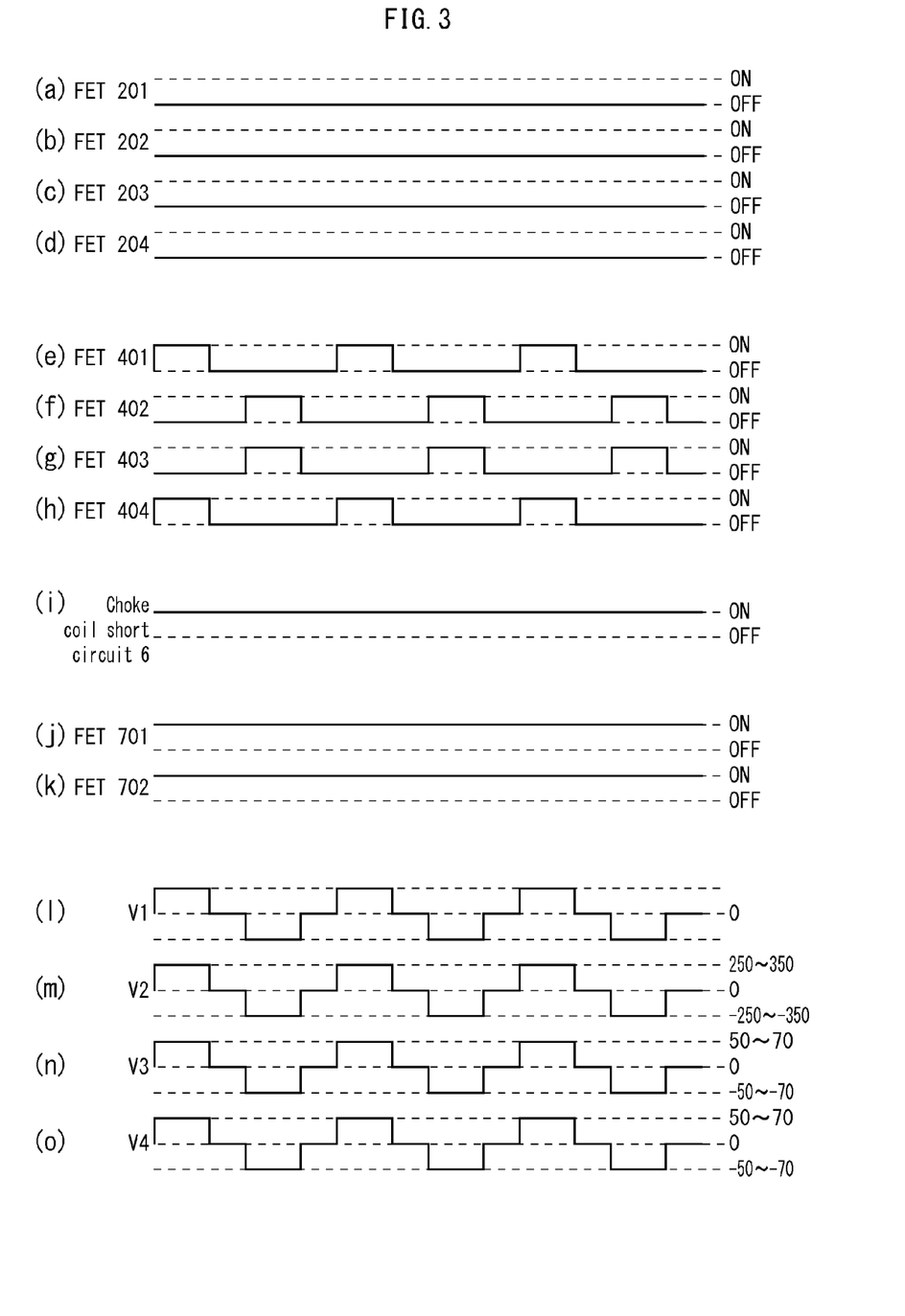
FIG. 3 is a timing diagram in a second time period pertaining to Embodiment 1.

FIG. 3 is a timing diagram in the second time period pertaining to Embodiment 1. FIG. 3 respectively shows, in (a), (b), (c), (d), (e), (f), (g), (h), (i), (j), and (k), waveforms of control signals for the FETs 201, 202, 203, 204, 401, 402, 403, and 404, the choke coil short circuit 6, and the FETs 701 and 702 output from the control circuit 10. Waveforms in (l), (m), (n), and (o) of FIG. 3 respectively show a change in the voltage V1 across the primary winding 301, a change in the voltage V2 across the first secondary winding 302, a change in the voltage V3 across the second secondary winding 303, and a change in the voltage V4 after passing through the conduction angle adjustment circuit 7.

In the second time period, each of the FETs 201 to 204 is turned off as shown in (a), (b), (c), and (d) of FIG. 3 so that the DC/AC inverter 2 is in the suspended state. The choke coil short circuit 6 is turned on as shown in (i) of FIG. 3 so that the choke coil short circuit 6 is short-circuited.

As shown in (e), (f), (g), and (h) of FIG. 3, the control circuit 10 controls the on-duty of the FETs 401, 402, 403, and 404 so that the voltage across the capacitor 903 becomes 14 V. As a result, a voltage having a waveform shown in (m) of FIG. 3 is induced in the first secondary winding 302. The peak value of the voltage V2 across the first secondary winding 302 depends on an output voltage of the main battery MBA, and varies within a range of 250 V to 350 V depending on a state of charge. Although a voltage having a waveform shown in (l) of FIG. 3 is induced in the primary winding 301 and charges the capacitor 105 via the body diodes of the FETs 201, 202, 203, and 204, this power is ignored as it is extremely low. For the above-mentioned reason, the peak value of the voltage V1 across the primary winding 301 is not indicated in (1) of FIG. 3.

A voltage having a waveform shown in (n) of FIG. 3 is induced in the second secondary winding 303. The peak value of the voltage V3 across the second secondary winding 303 depends on the turns ratio of the first secondary winding 302 to the second secondary winding 303, and is 50 (=250/5) V to 70 (=350/5) V.

As shown in (j) and (k) of FIG. 3, since the FETs 701 and 702 are on in the second time period, the voltage V4 after passing through the conduction angle adjustment circuit 7 shown in (o) of FIG. 3 is the same as the voltage V3 across the second secondary winding 303.

[Summary]

The secondary-side circuit 4 included in the battery charger 1000 pertaining to the present embodiment is similar to the secondary-side circuit pertaining to Patent Literature 1 in that it converts the DC voltage from the main battery into the AC voltage and supplies the AC voltage to the first secondary winding. In the present embodiment, however, the secondary-side circuit 4 is configured as a full-bridge circuit. Although the secondary winding 1003b of the transformer has to have three terminals with the circuit structure of the battery charger pertaining to Patent Literature 1, the first secondary winding 302 of the transformer 3 only has to have two terminals, as the number of input terminals of the full-bridge circuit is two. As described above, in the present embodiment, the number of terminals of the first secondary winding can be reduced, and, as a result, the transformer can be reduced in size.

Furthermore, according to the present embodiment, by configuring the rectifier circuit 8 and the second smoothing circuit 9 so as to have the circuit structure as shown in FIG. 1, a center tap of the second secondary winding 303 can also be eliminated. Compared to Patent Literature 1, the number of terminals of the transformer can be reduced by two in the present embodiment. The battery charger can thus be further reduced in size.

Embodiment 2

Embodiment 2 is different from Embodiment 1 only in the timing diagram in the first time period, and is similar to Embodiment 1 in the structure of the battery charger (FIG. 1). The following describes Embodiment 2 with reference to FIGS. 1 and 4.

Figure 4:
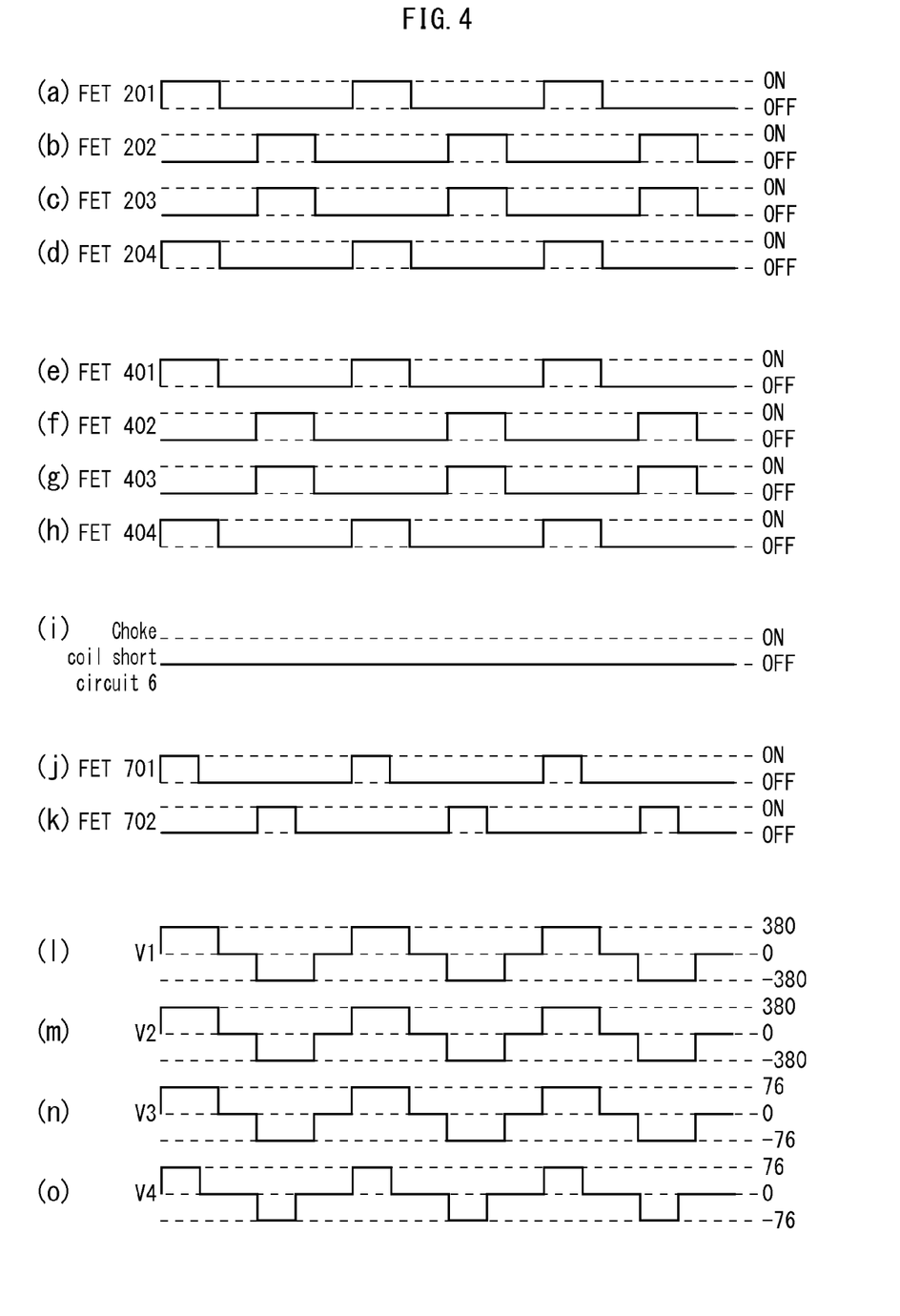
FIG. 4 is a timing diagram in the first time period pertaining to Embodiment 2.

FIG. 4 is a timing diagram in the first time period pertaining to Embodiment 2. The timing diagram in the first time period of FIG. 4 is different from that of FIG. 2 only in the control over the FETs 401 to 404 included in the secondary-side circuit 4. In brief, switching operation is performed on the FETs 401 to 404 included in the secondary-side circuit 4 in synchronization with current flowing from the first secondary winding 302 to the FETs 401 to 404, so that current flows through channel regions of the FETs 401 to 404. The following describes details of the present embodiment.

As shown in (e), (f), (g), and (h) of FIG. 4, the control circuit 10 performs control so that the FETs 401 and 404 are on and the FETs 402 and 403 are off for a time period for which the voltage V2 ((m) of FIG. 4) across the first secondary winding 302 has a positive finite value (380 V here) not equal to 0 V. By performing such control, for the time period for which the voltage V2 across the first secondary winding 302 has the positive finite value not equal to 0 V, current flows along a route passing through the first secondary winding 302, the FET 401, the choke coil 501, the capacitor 502, and the FET 404 in that order. In this case, in the present embodiment, by turning on the FETs 401 and 404 by applying thereto the reverse bias as the drain-source voltage, current flows not through the body diodes but through the channel regions of the FETs 401 and 404.

The control circuit 10 also performs control so that the FETs 402 and 403 are on and the FETs 401 and 404 are off for a time period for which the voltage V2 across the first secondary winding 302 has a negative finite value (−380 V here) not equal to 0 V. By performing such control, current flows along a route passing through the first secondary winding 302, the FET 403, the choke coil 501, the capacitor 502, and the FET 402 in that order. In this time period, by turning on the FETs 402 and 403 by applying thereto the reverse bias as the drain-source voltage, current flows not through the body diodes but through the channel regions of the FETs 402 and 403.

In the first time period for which the secondary-side circuit 4 performs rectification, in Embodiment 1, current flows not through the channel regions but through the body diodes of the FETs 401 to 404 as the FETs 401 to 404 are off, unlike in the present embodiment. The body diode incorporated in the FET typically produces a high forward voltage drop, and thus a power loss of the FET is relatively large. According to the present embodiment, however, current flows not through the body diodes but through the channel regions of the FETs that produce a lower forward voltage drop than the body diodes. The power loss of each of the FETs can thus be reduced compared to Embodiment 1.

As set forth the above, according to the present embodiment, a battery charger that can not only be reduced in size but also reduce the power loss in the secondary-side circuit can be provided.

Embodiment 3

Embodiment 3 is different from Embodiment 1 in the circuit structure of the rectifier circuit and the timing diagram in the first and second time periods. Embodiment 3 is similar to Embodiment 1 (FIG. 1) in the structure other than the structure of the rectifier circuit included in the battery charger. The following describes Embodiment 3 with reference to FIGS. 1, 5, and 6.

Figure 5:
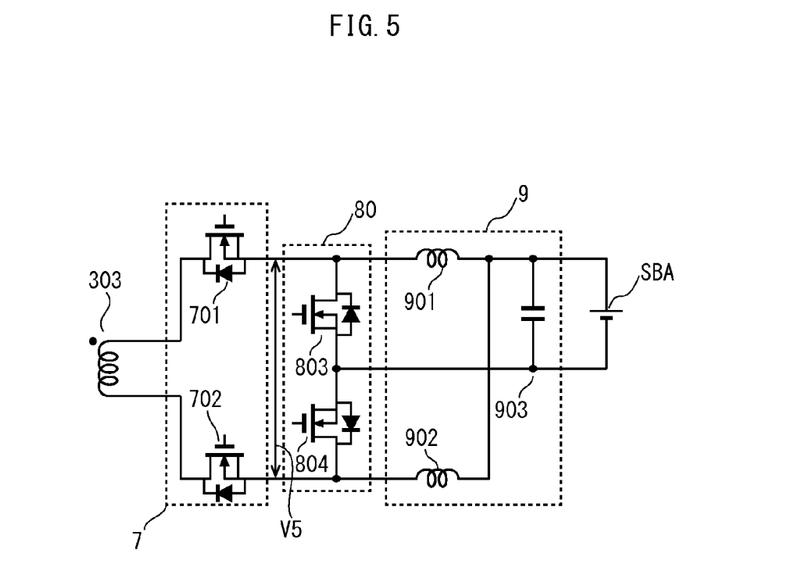
FIG. 5 is a circuit diagram showing a partial structure of a battery charger pertaining to Embodiment 3.

FIG. 5 is a circuit diagram showing a partial structure of a battery charger pertaining to Embodiment 3.

A rectifier circuit 80 pertaining to the present embodiment includes FETs 803 and 804 as rectifier elements in place of the diodes 801 and 802 in Embodiment 1. The FET 803 is connected to one end of the second secondary winding 303, and the FET 804 is connected to the other end of the second secondary winding 303. As with the FETs 201 to 204 and 401 to 404, a freewheeling diode is connected in parallel to each of the FETs 803 and 804. In the present embodiment, a body diode incorporated in each of the FETs is used as the freewheeling diode.

Independently of the first time period or the second time period, the rectifier circuit 80 rectifies the AC voltage from the conduction angle adjustment circuit 7, and supplies the rectified voltage to the second smoothing circuit 9.

Figure 6:
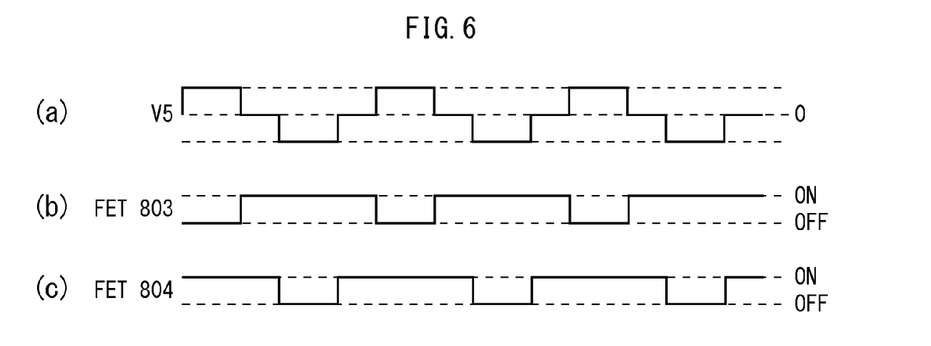
FIG. 6 is a timing diagram pertaining to Embodiment 3.

FIG. 6 is a timing diagram pertaining to Embodiment 3. FIG. 6 shows, in (a), a voltage V5 after passing through the conduction angle adjustment circuit 7 (an output voltage of the conduction angle adjustment circuit). The voltage V5 is also shown in FIG. 5. FIG. 6 respectively shows, in (b) and (c), waveforms of control signals for the FETs 803 and 804 output from the control circuit 10. As described above, the rectifier circuit 80 performs rectification independently of the first time period or the second time period. The timing diagram of FIG. 6 is thus common to the first and second time periods. In brief, switching operation is performed on the FETs 803 and 804 included in the rectifier circuit 80 in synchronization with current flowing through the FETs 803 and 804, so that current flows through channel regions of the FETs 803 and 804. The following describes details of the present embodiment.

For a time period for which the voltage V5 after passing through the conduction angle adjustment circuit 7 shown in (a) of FIG. 6 has a positive finite value not equal to 0 V, control is performed so that the FET 803 is off and the FET 804 is on as shown in (b) and (c) of FIG. 6. Although the peak value of the voltage V5 after passing through the conduction angle adjustment circuit 7 is not indicated in FIG. 6, the peak value of the voltage V5 is 76 V in the first time period, and is 50 V to 70 V in the second time period, as described with reference to FIGS. 2 and 3.

In the time period for which the voltage V5 after passing through the conduction angle adjustment circuit 7 has the positive finite value not equal to 0 V, current flows along a route passing through the conduction angle adjustment circuit 7, the choke coil 901, the capacitor 903, and the FET 804 in that order, and along a route passing through the choke coil 902, the capacitor 903, and the FET 804 in that order so as to release energy having stored in the choke coil 902. In this time period, in the present embodiment, by turning on the FET 804 by applying thereto the reverse bias as the drain-source voltage, current flows not through the body diode but through the channel region of the FET 804.

For a time period for which the voltage V5 after passing through the conduction angle adjustment circuit 7 shown in (a) of FIG. 6 has a negative finite value not equal to 0 V, control is performed so that the FET 803 is on and the FET 804 is off as shown in (b) and (c) of FIG. 6. In this time period, current flows along a route passing through the conduction angle adjustment circuit 7, the choke coil 902, the capacitor 903, and the FET 803 in that order, and along a route passing through the choke coil 901, the capacitor 903, and the FET 803 in that order so as to release energy having stored in the choke coil 901. In this time period, by turning on the FET 803 by applying thereto the reverse bias as the drain-source voltage, current flows not through the body diode but through the channel region of the FET 803.

For a time period for which the voltage V5 after passing through the conduction angle adjustment circuit 7 shown in (a) of FIG. 6 is 0 V, control is performed so that the FETs 803 and 804 are both on as shown in (b) and (c) of FIG. 6. In this time period, current flows along a route passing through the choke coil 901, the capacitor 903, and the FET 803 in that order, and along a route passing through the choke coil 902, the capacitor 903, and the FET 804 in that order. In this case, by turning on both of the FETs 803 and 804 by applying thereto the reverse bias as the drain-source voltage, current flows not through the body diodes but through the channel regions of the FETs 803 and 804.

The diodes 801 and 802 used in the rectifier circuit 8 in Embodiment 1 are bipolar diode elements, and thus produce a relatively high forward voltage drop. On the other hand, in the present embodiment, current flows through unipolar channel regions of the FETs in the forward direction. The unipolar channel regions typically produce a lower forward voltage drop than the bipolar diode elements. The power loss in the rectifier circuit can thus be reduced in the present embodiment, compared to Embodiment 1.

As set forth the above, according to the present embodiment, the battery charger can not only be reduced in size but also reduce the power loss in the rectifier circuit. The present embodiment has been described as modifications to Embodiment 1. The present embodiment, however, may be combined with Embodiment 2 to further reduce the power loss.

[Modifications]

Embodiments 1 to 3 have been described above. The present invention, however, is not limited to these embodiments. For example, modifications as described below are considered.

(1) In the above-mentioned embodiments, the power factor correction circuit 1 is achieved by a power factor correction circuit. The present invention, however, is not limited to such a structure. As long as an AC voltage for commercial use can be converted into a DC voltage, the power factor correction circuit 1 may be achieved, for example, by a smoothing/rectifier circuit including a diode bridge and a capacitor. However, achieving the power factor correction circuit 1 by the power factor correction circuit is advantageous in that it supports a worldwide AC voltage, and there is no need to separately take any measures to regulate harmonic current.

(2) The voltage values and the switching frequency described in the above-mentioned embodiments are just examples, and may be different values from those described above. Although the output voltage of the power factor correction circuit 1 is set to 380 V in Embodiment 1, it may be set to 390 V, for example. Similarly, although the switching frequency used in the DC/AC inverter 2 is set to 100 kHz, it may be set to 150 kHz.

(3) In Embodiment 1, the switching unit and the rectifying unit included in each of the power factor correction circuit 1, the DC/AC inverter 2, the secondary-side circuit 4, and the conduction angle adjustment circuit 7 are integrally formed by an FET. The present invention, however, is not limited to such a structure. For example, the switching unit may be achieved by an insulated gate bipolar transistor (IGBT), a static induction transistor (SIT), a gate injection transistor (GIT), or Si-based bipolar transistor. When a transistor not incorporating a body diode is used, another diode may separately be connected in parallel to the transistor as the rectifying unit.

That is to say, the parallel-connected body in the present invention may be achieved by a switching unit and a rectifying unit that are integrally formed, or by a switching unit and a rectifying unit as separate elements as in a case where a separate diode element is used as a freewheeling diode.

In Embodiment 2, since it is necessary to allow current to flow through the FET included in the secondary-side circuit 4 in the reverse direction, it is preferable to use, as the switching unit included in the secondary-side circuit 4, a transistor that allows current to flow both in the forward direction and in the reverse direction. In Embodiment 3, it is also preferable to use, as the switching unit included in the rectifier circuit 80, a transistor that allows current to flow both in the forward direction and in the reverse direction.

(4) In the above-mentioned embodiments, the primary winding 301, the first secondary winding 302, and the second secondary winding 303 included in the transformer 3 are set to be in the turns ratio of 5:5:1. This turns ratio, however, is just one example. Needless to say, the number of turns varies depending on the specifications for the output voltages of the power factor correction circuit 1, the main battery MBA, and the sub-battery SBA.

(5) The external power supply AC may be power generated by solar panels installed on roofs of houses, for example, in place of the commercial power supply described above.

(6) In the above-mentioned embodiments, the choke coil short circuit 6 is achieved by a relay. The present invention, however, is not limited to such a structure. The choke coil short circuit 6 may be achieved by a switching element such as the transistor as mentioned above. Since FETs, IGBTs, and the like incorporate the body diodes, in order to achieve opening of these elements in both directions, any ingenuity, such as connecting two FETs, IGBTs, and the like in mutually-opposite direction in series, is required.

(7) In the above-mentioned embodiments, the control circuit 10 controls the DC/AC inverter and the secondary-side circuit by a simple duty control. The present invention, however, is not limited to such a structure. As long as the voltages having the waveforms shown in (l) and (m) of FIG. 2 are applied in the first time period, a so-called phase-shift control and the like may be performed.

(8) In the above-mentioned embodiments, center taps of both of the first secondary winding and the second secondary winding are eliminated. As long as at least the first secondary winding has no center tap, however, the battery charger can be reduced in size, compared to the battery charger pertaining to Patent Literature 1.

(9) Each of the drawings only schematically shows arrangements of the elements to the extent that the present invention can be understood. The present invention is thus not limited to the examples illustrated in each of the drawings. For simplicity's sake, part of the structure is omitted from of the drawings.

(10) The above-mentioned embodiments and modifications are mere preferred examples of the present invention, and the present invention is not limited to these examples. The structures described in these embodiments and modifications may be combined with one another as appropriate.

INDUSTRIAL APPLICABILITY

The present invention is preferably applicable to a battery charger loaded in equipment that is required to be reduced in size, such as a hybrid electric vehicle, a normal electric vehicle, an electric compressor, an electric power steering, an elevator, and a wind power generation system.

REFERENCE SIGNS LIST 1 power factor correction circuit
2 DC/AC inverter
3 transformer
4 secondary-side circuit 4
5 first smoothing circuit
6 choke coil short circuit
7 conduction angle adjustment circuit
8, 80 rectifier circuit
9 second smoothing circuit
10 control circuit
101 diode bridge
102 choke coil
103 FET
104 diode
105 capacitor
201, 202, 203, 204 FET
301 primary winding
302 first secondary winding
303 second secondary winding
401, 402, 403, 404 FET
501 choke coil
502 capacitor
701, 702 FET
801, 802 diode
803, 804 FET
901, 902 choke coil
903 capacitor
1000 battery charger
AC external power supply
MBA main battery
SBA sub-battery

The invention claimed is:

1. A battery charger non-concurrently performing a first operation to charge a main battery and a sub-battery by using an external power supply, and a second operation to charge the sub-battery by using the main battery, comprising:
a power supply circuit connected to the external power supply and configured to generate an AC voltage;
a transformer including a primary winding, a first secondary winding, and a second secondary winding, the primary winding being connected to the power supply circuit;
a secondary-side circuit along a power supply route connecting the first secondary winding to the main battery, the secondary-side circuit being configured to perform, in a first time period for which the first operation is performed, an operation to rectify an AC voltage induced in the first secondary winding and supply the rectified voltage to the main battery, and, in a second time period for which the second operation is performed, an operation to convert a DC voltage from the main battery into an AC voltage and supply the AC voltage resulting from the conversion to the first secondary winding;

a conduction angle adjustment circuit along a power supply route connecting the second secondary winding to the sub-battery, the conduction angle adjustment circuit being configured to adjust a conduction angle of an AC voltage induced in the second secondary winding; and a control circuit configured to control the power supply circuit, the secondary-side circuit, and the conduction angle adjustment circuit, wherein the secondary-side circuit is a full-bridge circuit including a plurality of arms connected in parallel, the arms each including a plurality of parallel-connected bodies connected in series, the parallel-connected bodies each including a switching unit and a rectifying unit connected in parallel, and in the first time period, the control circuit controls the conduction angle adjustment circuit so that the conduction angle adjustment circuit is in a conductive state at a timing at which a voltage having a positive or negative finite value not equal to 0 V is induced in the primary winding.

2. The battery charger according to claim 1, wherein in the first time period, the power supply circuit boosts an AC voltage supplied from the external power supply so that the main battery is charged, the secondary-side circuit rectifies the AC voltage induced in the first secondary winding, and the conduction angle adjustment circuit adjusts the conduction angle of the AC voltage induced in the second secondary winding so that the sub-battery is charged, and in the second time period, the power supply circuit is in a suspended state, the secondary-side circuit converts the DC voltage from the main battery into the AC voltage so that the sub-battery is charged, and the conduction angle adjustment circuit adjusts the conduction angle of the AC voltage induced in the second secondary winding so that an AC voltage to be supplied to the sub-battery is obtained.

3. The battery charger according to claim 2, wherein the secondary-side circuit includes a first arm and a second arm connected in parallel, the first arm being connected to one end of the first secondary winding, and including a first high-side parallel-connected body and a first low-side parallel-connected body, the second arm being connected to the other end of the first secondary winding, and including a second high-side parallel-connected body and a second low-side parallel-connected body, and each of the parallel-connected bodies is a field-effect transistor having a channel region as the switching unit and a body diode as the rectifying unit.

4. The battery charger according to claim 3, wherein in the first time period, switching operation is performed on the parallel-connected bodies included in the secondary-side circuit in synchronization with current flowing from the first secondary winding to the parallel-connected bodies, so that current flows through the switching units included in the parallel-connected bodies.

5. The battery charger according to claim 4, wherein in the first time period, for a time period for which the voltage induced in the first secondary winding has a positive finite value not equal to 0 V, the switching unit included in the first high-side parallel-connected body and the switching unit included in the second low-side parallel-connected body are on, and the switching unit included in the first low-side parallel-connected body and the switching unit included in the second high-side parallel-connected body are off, and for a time period for which the voltage induced in the first secondary winding has a negative finite value not equal to 0 V, the switching unit included in the first low-side parallel-connected body and the switching unit included in the second high-side parallel-connected body are on, and the switching unit included in the first high-side parallel-connected body and the switching unit included in the second low-side parallel-connected body are off.

6. The battery charger according to claim 1, further comprising a rectifier circuit along a power supply route connecting the conduction angle adjustment circuit to the sub-battery, wherein the rectifier circuit includes, as rectifier elements, a first field-effect transistor connected to one end of the second secondary winding and a second field-effect transistor connected to the other end of the second secondary winding, and switching operation is performed on the field-effect transistors included in the rectifier circuit in synchronization with current flowing through the field-effect transistors, so that current flows through channel regions included in the field-effect transistors.

7. The battery charger according to claim 6, wherein for a time period for which an output voltage of the conduction angle adjustment circuit has a positive finite value not equal to 0 V, the first field-effect transistor is off, and the second field-effect transistor is on, for a time period for which the output voltage of the conduction angle adjustment circuit has a negative finite value not equal to 0 V, the first field-effect transistor is on, and the second field-effect transistor is off, and for a time period for which the output voltage of the conduction angle adjustment circuit has a value equal to 0 V, the first field-effect transistor and the second field-effect transistor are both on.

* * * * *